US011879057B2

(12) United States Patent
Leskinen et al.

(10) Patent No.: US 11,879,057 B2
(45) Date of Patent: Jan. 23, 2024

(54) PROCESS FOR PREPARING POLYPROPYLENE COMPOSITION

(71) Applicant: BOREALIS AG, Vienna (AT)

(72) Inventors: Pauli Leskinen, Helsinki (FI); Luca Boragno, Pichling (AT)

(73) Assignee: BOREALIS AG, Vienna (AT)

( * ) Notice: Subject to any disclaimer, the term of this patent is extended or adjusted under 35 U.S.C. 154(b) by 306 days.

(21) Appl. No.: 16/640,654

(22) PCT Filed: Sep. 6, 2018

(86) PCT No.: PCT/EP2018/073973
§ 371 (c)(1),
(2) Date: Feb. 20, 2020

(87) PCT Pub. No.: WO2019/048529
PCT Pub. Date: Mar. 14, 2019

(65) Prior Publication Data
US 2020/0354554 A1 Nov. 12, 2020

(30) Foreign Application Priority Data

Sep. 8, 2017 (EP) ..................................... 17190020

(51) Int. Cl.
| | |
|---|---|
| *C08F 210/16* | (2006.01) |
| *C08F 2/00* | (2006.01) |
| *C08L 23/14* | (2006.01) |
| *C08F 4/646* | (2006.01) |
| *C08F 4/649* | (2006.01) |
| *C08F 4/654* | (2006.01) |
| *C08F 210/02* | (2006.01) |
| *C08F 210/06* | (2006.01) |
| *C08F 210/08* | (2006.01) |

(52) U.S. Cl.
CPC .............. *C08L 23/14* (2013.01); *C08F 2/001* (2013.01); *C08F 4/6465* (2013.01); *C08F 4/6492* (2013.01); *C08F 4/6546* (2013.01); *C08F 210/02* (2013.01); *C08F 210/06* (2013.01); *C08F 210/08* (2013.01); *C08F 2800/10* (2013.01); *C08L 2203/16* (2013.01); *C08L 2314/02* (2013.01)

(58) Field of Classification Search
CPC .... C08F 210/16; C08F 210/06; C08F 210/08; C08F 2/001; C08F 2500/36
See application file for complete search history.

(56) References Cited

U.S. PATENT DOCUMENTS

| | | | | |
|---|---|---|---|---|
| 6,365,682 B1* | 4/2002 | Alastalo | .................. | C08F 10/06 525/324 |
| 7,557,161 B2* | 7/2009 | Pelliconi | .............. | C08L 23/142 525/240 |
| 9,403,926 B2* | 8/2016 | Alastalo | ................. | C08F 210/06 |
| 9,512,253 B2* | 12/2016 | Reichelt | .................. | C08L 23/12 |
| 9,650,458 B2* | 5/2017 | Galvan | .................. | C08F 210/06 |
| 9,988,523 B2* | 6/2018 | Tranninger | ............ | C08L 23/142 |
| 10,150,828 B2* | 12/2018 | Cavalieri | .................... | C08J 5/18 |
| 10,233,271 B2* | 3/2019 | Leskinen | .............. | C08F 210/16 |
| 10,487,203 B2* | 11/2019 | Boragno | .................... | C08J 5/18 |
| 10,875,945 B2* | 12/2020 | Marzolla | ............... | C08F 210/06 |
| 11,292,858 B2* | 4/2022 | Boragno | ............... | C08F 120/02 |
| 11,292,901 B2* | 4/2022 | Wang | .................. | C08K 5/1565 |
| 11,414,500 B2* | 8/2022 | Leskinen | .............. | C08F 4/6546 |
| 2013/0178573 A1 | 7/2013 | Paavilainen et al. | | |
| 2016/0312018 A1* | 10/2016 | Vestberg | ............... | C08F 210/06 |
| 2019/0367642 A1* | 12/2019 | Leskinen | .............. | C08F 4/6492 |

FOREIGN PATENT DOCUMENTS

| | | |
|---|---|---|
| BR | 112019009301 A2 | 7/2019 |
| CA | 2984068 A1 | 12/2016 |
| CN | 102272166 A | 12/2011 |
| CN | 104159965 A | 11/2014 |
| CN | 104619729 A | 5/2015 |
| CN | 104903365 A | 9/2015 |
| CN | 105899554 A | 8/2016 |
| CN | 1267310 A | 9/2020 |
| EP | 0887379 A1 | 12/1998 |
| EP | 0887380 A1 | 12/1998 |
| EP | 2610271 A1 | 7/2013 |
| EP | 2610272 A1 | 7/2013 |
| EP | 2808352 A1 | 3/2014 |
| EP | 2749580 A1 | 7/2014 |
| EP | 3064514 A1 | 9/2016 |
| EP | 3064548 A1 | 9/2016 |
| JP | H11279345 A | 10/1999 |
| JP | 2004002759 A | 1/2004 |
| KR | 20150090218 A | 8/2015 |

(Continued)

OTHER PUBLICATIONS

Applicant: Borealis AG; "Process for Preparing Polypropylene Composition"; Korean Patent Application No. 10-2020-7008101; Notice of Allowance dated Oct. 27, 2021; 3 pgs.

Busico, et al., "Microstructure of polypropylene", Prog. Polym. Sci. 26 (2001) pp. 443-533.

Busico, et al., "Alk-1-ene Polymerization in the Presence of a Monocyclopentadienyl Zirconium(IV) Acetamidinate Catalyst: Microstructural and Mechanistic Insightsa", Macromol. Rapid Commun. 2007, 28, pp. 1128-1134.

Busico, et al., "Full Assignment of the 13C NMR Spectra of Regioregular Polypropylenes: Methyl and Methylene Region", Macromolecules 1997, 30, 6251-6263.

(Continued)

*Primary Examiner* — Rip A Lee

(74) *Attorney, Agent, or Firm* — TAROLLI, SUNDHEIM, COVELL & TUMMINO L.L.P.

(57) ABSTRACT

The invention relates to a process for producing a polypropylene composition by sequential polymerization, said polypropylene composition having low sealing initiation temperature (SIT) and high melting point (Tm), thus providing abroad sealing window.

11 Claims, No Drawings

(56) References Cited

FOREIGN PATENT DOCUMENTS

| KR | 20150135331 | A | | 12/2015 | | |
|---|---|---|---|---|---|---|
| WO | 98/58971 | A1 | | 12/1998 | | |
| WO | 99/24478 | A1 | | 5/1999 | | |
| WO | 2004/000899 | A1 | | 12/2003 | | |
| WO | 2004/111095 | A1 | | 12/2004 | | |
| WO | 2012/007430 | A1 | | 1/2012 | | |
| WO | 2013/083576 | A1 | | 6/2013 | | |
| WO | 2014102128 | A1 | | 7/2014 | | |
| WO | 2014/139811 | A2 | | 9/2014 | | |
| WO | 20140139811 | A2 | | 9/2014 | | |
| WO | WO 2014/139811 | A2 | * | 9/2014 | ............ | C08F 210/16 |
| WO | 2016198601 | A1 | | 12/2016 | | |
| WO | 2018122031 | A1 | | 7/2018 | | |

OTHER PUBLICATIONS

Castignolles, et al., "Detection and quantification of branching in polyacrylates by size-exclusion chromatography (SEC) and melt-state 13C NMR spectroscopy", Polymer 50 (2009) 2373-2383.

Filip, et al., "Heteronuclear decoupling under fast MAS by a rotor-synchronized Hahn-echo pulse train", Journal of Magnetic Resonance 176 (2005) 239-243.

Griffin, et al., "Low-load rotor-synchronised Hahn-echo pulse train (RS-HEPT) 1H decoupling in solid-state NMR: factors affecting MAS spin-echo dephasing times", Magn. Reson. Chem. 2007; 45: S198-S208.

Klimke, et al., "Optimisation and Application of Polyolefin Branch Quantification by Melt-State 13C NMR Spectroscopy", Macromol. Chem. Phys. 2006, pp. 382-395.

Parkinson, et al., "Effect of Branch Length on 13C NMR Relaxation Properties in Molten Poly[ethylene-co-(a-olefin)] Model Systems", 2007, pp. 21828-2133.

Pollard, et al., "Observation of Chain Branching in Polyethylene in the Solid State and Melt via 13C NMR Spectroscopy and Melt NMR Relaxation Time Measurements", Macromolecules 2004, pp. 813-825.

Resconi et al., "Selectivity in Propene Polymerization with Metallocene Catalysts", Chem. Rev. 2000, 100, pp. 1253-1345.

Zhou et al., "A new decoupling method for accurate quantification of polyethylene copolymer composition and triad sequence distribution with 13C NMR", Journal of Magnetic Resonance 187 (2007) pp. 225-233.

Extended European Search Report for Application No. 17190020. 2-1102, dated Mar. 9, 2018.

Applicant: Borealis AG; Canadian Office Action for Application No. 33069271; Process for Preparing Polypropylene Composition; dated May 25, 2021, 4 pgs.

Applicant: Borealis AG; "Process for Preparing Polypropylene Composition"; Chinese Application No. 201880053089.4;Chinese Office Action; dated Dec. 2, 2021; 27 pgs.

Chifeng Zhong, et al., "Study on TiCl4/MgCl2 Catalysts for Propylene Polymerization the Functions of the Internal Donors in Catalyst Systems"; Acta Polymerica Sinica; No. 2; Apr. 2003; 6 Pgs.

Applicant: Borealis AG; Korean Office Action for Application No. 10-2020-7008101; Process for Preparing Polypropylene Composition; dated Apr. 5, 2021, 14 pgs.

Applicant: Borealis AG; "Process for Preparing Polypropylene Composition"; Chinese Application No. 201880053089.4;Chinese Office Action; dated Jun. 20, 2022; 21 pgs.

Applicant: Borealis AG; European Application No. 18762528.0; European Office Action dated Mar. 10, 2023; 5 pgs.

Brazilian Application No. BR1120200082820-7 Office Action dated Apr. 5, 2023.

United Arab Emirates Application No. P6000226, Office Action dated Oct. 30, 2023.

* cited by examiner

PROCESS FOR PREPARING POLYPROPYLENE COMPOSITION

The present invention relates to a process for producing a polypropylene composition by sequential polymerization. More specifically, the invention relates to a process for producing a polypropylene composition comprising propylene, ethylene and one or more $C_4$-$C_{10}$ to alpha-olefins. Further, the invention is directed to a polypropylene composition comprising propylene, ethylene and one or more comonomers selected from $C_4$-$C_{10}$ to alpha-olefins. The invention further relates to an article comprising the polypropylene composition.

Propylene homopolymers and copolymers are suitable for many applications such as packaging, textile, automotive and pipe. An important area of application of propylene homopolymers or copolymers is the packaging industry. Particularly, in film application where sealing properties play an important role, e.g., heat sealing. Heat sealing is the predominant method of manufacturing flexible and semi-rigid packages. Important characteristics of good sealing performance are:
a) low seal initiation temperature (SIT), which is needed to support high speed on packaging machines,
b) broad sealing window, which is especially needed for processing window on Horizontal Form, Fill and Seal (HFFS) packaging lines and
c) additionally high melting point, which is important, for example in biaxially oriented polypropylene (BOPP), to avoid stickiness and blocking and to accomplish high BOPP line speeds.

To ensure fast sealing, a low SIT is of advantage since, by operating at lower temperature, there is the benefit that the article to be sealed is not exposed to high temperatures. There are also economic advantages due to the fact that lower temperatures are cheaper to generate and maintain.

There are further advantages by avoiding high sealing temperatures, especially, when temperature sensitive goods are to be packed.

In the polyolefin film field, the properties of a specific type of film come generally from the polyolefin composition comprised in such film. A process allowing the production of said polyolefin composition is then of high relevance for getting the required polyolefin properties. Thus, there is a general need of a polyolefin composition having low seal initiation temperature (SIT) and high melting point. As well as there is also a need of a process for producing said polyolefin composition having the required low seal initiation temperature (SIT) and high melting point properties.

WO9858971 discloses a process for producing terpolymers of propylene and at least two different alpha-olefins, said terpolymers having a low melting point, wherein the process is carried out in at least one slurry reactor in the presence of catalysts at elevated temperature, characterized by the following steps: a) feeding into a slurry reactor a reaction mixture containing 50-85 wt-% of propylene, 1-10 wt-% of ethylene, 15-40 wt-% of other $C_4$-$C_8$ alpha-olefin, a catalyst system capable of providing olefin polymerization at said temperature conditions, and optionally hydrogen, b) polymerizing said reaction mixture at a temperature of less than 70° C. a sufficient time to obtain a propylene terpolymer amounting to 50-99 wt-% of the end product, c) transferring said reaction mixture into a gas phase reactor operated at a pressure of higher than 5 bars, and d) continuing polymerization in said gas phase reactor for producing a propylene terpolymer amounting to 1 to 50 wt-% of the end product, whereby a terpolymer is obtained having a melting temperature of less than 135° C., preferably less than 132° C.

However, the polymerization process in WO9858971 produces, in the slurry reactor, a propylene copolymer comprising ethylene and $C_4$-$C_8$ alpha-olefins. Additionally, the produced propylene terpolymer has a melting temperature of less than 135° C.

The present invention is based on the finding that the above discussed needs for heat sealing applications, i.e., simultaneously having improved balance between high melting point and low sealing initiation temperature (SIT), broad sealing window and thermal stability can be achieved by a process for producing a specific polyolefin composition.

Thus the present invention provides a process for producing a polypropylene composition by sequential polymerization comprising the steps:
a) polymerizing in a first reactor, preferably a slurry reactor, monomers comprising propylene and one or more comonomers selected from $C_4$-$C_{10}$ alpha-olefins, to obtain a first propylene polymer fraction having a comonomer content in the range of from 2.0 to 8.0 mol %,
b) polymerizing in a second reactor, preferably a first gas-phase reactor, monomers comprising propylene and one or more comonomers selected from ethylene and $C_4$-$C_{10}$ alpha-olefins, in the presence of the first propylene polymer fraction, to obtain a second propylene polymer fraction,
c) polymerizing in a third reactor, preferably a second gas-phase reactor, monomers comprising propylene and one or more comonomers selected from ethylene and optionally $C_4$-$C_{10}$ alpha-olefins, in the presence of the second propylene polymer fraction, to obtain a polypropylene composition having an ethylene comonomer content in the range of from 0.5 to 5.0 mol % and a $C_4$-$C_{10}$ alpha-olefin comonomer content in the range of from 3.0 to 10.0 mol %, relative to the total amount of monomers present in the polypropylene composition.

The first propylene polymer fraction, the second propylene polymer fraction and the polypropylene composition, according to the present invention, are produced in a sequential polymerization process. The term "sequential polymerization process", in the present application, indicates that the first propylene polymer fraction, the second propylene polymer fraction and the polypropylene composition are produced in a process comprising at least three reactors connected in series. In one preferred embodiment the term "sequential polymerization process" indicates, in the present application, that the reaction mixture of the first reactor, i.e., the first propylene polymer fraction with unreacted monomers, is conveyed, preferably directly conveyed; into a second reactor where a second propylene polymer fraction is obtained. The reaction mixture of the second reactor, i.e., the second propylene polymer fraction with unreacted monomers, is conveyed, preferably directly conveyed; into a third reactor where the polypropylene composition is obtained.

Accordingly, in the process according to the invention:
i—the first propylene polymer fraction obtained in the first reactor generally comprises a first propylene polymer which is produced in said first reactor,
ii—the second propylene polymer fraction obtained in the second reactor generally comprises a second propylene polymer which is produced in said second reactor,
iii—the polypropylene composition obtained in the third reactor generally comprises a third propylene polymer which is produced in said third reactor.

Accordingly, the present process comprises at least a first reactor, a second reactor and a third reactor. The process may comprise at least one additional polymerization reactor subsequent to the third reactor. In one specific embodiment the process according to the invention consists of three polymerization reactors i.e., a first reactor, a second reactor and a third reactor. The term "polymerization reactor" shall indicate that the main polymerization takes place. Thus, in case the process consists of three or more polymerization reactors, this definition does not exclude the option that the overall process comprises for instance a pre-polymerization step in a pre-polymerization reactor. The term "consists of" is only a closing formulation in view of the main polymerization reactors. In case the overall process according to the invention comprises a pre-polymerization reactor, the term "first propylene polymer fraction" means the sum of (co)polymer produced in the pre-polymerization reactor and the (co)polymer produced in the first reactor.

The reactors are generally selected from slurry and gas phase reactors.

The first reactor is preferably a slurry reactor and can be any continuous or simple stirred batch tank reactor or loop reactor operating in bulk polymerization or slurry polymerization. By "bulk polymerization" it is meant a process where the polymerization is conducted in a liquid monomer essentially in the absence of an inert diluent. However, it is known to a person skilled in the art, that the monomers used in commercial production are never pure but always contain aliphatic hydrocarbons as impurities. For instance, the propylene monomer may contain up to 5% of propane as an impurity. Thus, "bulk polymerization" preferably means a polymerization in a reaction medium that comprises at least 60% (wt/wt) of the monomer. According to the present invention, the first reactor is more preferably a loop reactor.

The second reactor is preferably a first gas-phase reactor. Said first gas-phase reactor can be any mechanically mixed or fluidized bed reactor or settled bed reactor. Preferably, the first gas-phase reactor comprises a mechanically agitated fluidized bed reactor with gas velocities of at least 0.2 m/sec. The first gas-phase reactor of a fluidized bed type reactor can further include a mechanical agitator to facilitate the mixing within the fluidized bed.

The third reactor is preferably a second gas-phase reactor. Said second gas-phase reactor can be any mechanically mixed or fluidized bed reactor or settled bed reactor. Preferably, the second gas-phase reactor comprises a mechanically agitated fluidized bed reactor with gas velocities of at least 0.2 m/sec. The second gas-phase reactor of a fluidized bed type reactor can further include a mechanical agitator to facilitate the mixing within the fluidized bed.

The potentially subsequent polymerization reactor or reactors is/are preferably a gas-phase reactor.

A preferred polymerization process is a "loop-gas phase"-process, such as developed by Borealis and known as BORSTAR™ technology. Examples of this polymerization process are described in EP0887379, WO2004/000899, WO2004/111095 and WO99/24478.

When the overall process according to the invention comprises a pre-polymerization reactor, said pre-polymerization step takes place prior to the polymerization in the first reactor. The pre-polymerization step takes place in a pre-polymerization reactor wherein pre-(co)polymerization of propylene is conducted. The pre-polymerization reactor is of smaller size compared to the first reactor, the second reactor, the third reactor and the subsequent polymerization reactor or reactors, according to the invention, respectively. The reaction volume of the pre-polymerization reactor can be, for example, between 0.001% and 10% of the reaction volume of the first reactor, like the loop reactor. In said pre-polymerization reactor, the pre-(co)polymerization of propylene is performed in bulk or slurry, producing a propylene (co)polymer.

The operating temperature in the pre-polymerization reactor is in the range of from 0 to 60° C., preferably in the range of from 15 to 50° C., more preferably in the range of from 18 to 35° C.

The pressure in the pre-polymerization reactor is not critical but must be sufficiently high to maintain the reaction mixture in liquid phase. Thus, the pressure in the pre-polymerization reactor may be in the range of from 20 to 100 bar, preferably in the range of from 30 to 70 bar.

Hydrogen can be added in the pre-polymerization reactor in order to control the molecular weight, and thus the melt flow rate MFR2 of the propylene (co)polymer produced in the pre-polymerization reactor.

In the first reactor of the process according to the invention, a monomer feed comprised of propylene and one or more comonomers selected from $C_4$-$C_{10}$ alpha-olefins is fed. In case the pre-polymerization step is present in the process, the propylene (co)polymer produced in the pre-polymerization reactor, is also fed into the first reactor. In the first reactor, a first propylene polymer fraction is obtained.

The first propylene polymer fraction generally has a comonomer content selected from $C_4$-$C_{10}$ alpha-olefins in the range of from 2.0 to 8.0 mol %, preferably in the range of from 3.0 to 7.0 mol %, more preferably in the range of from 4.5 to 6.5 mol %, relative to the total amount of monomers present in the first propylene polymer fraction.

Generally, the first propylene polymer fraction has a melt flow rate ($MFR_2$) in the range of from 3 to 12 g/10 min, preferably in the range of from 4 to 10 g/10 min, more preferably in the range of from 5 to 8 g/10 min. The $MFR_2$ is determined according to ISO 1133, at a temperature of 230° C. and under a load of 2.16 kg.

The operating temperature in the first reactor is generally in the range of from 62 to 85° C., preferably in the range of from 65 to 82° C., more preferably in the range of from 67 to 80° C.

Typically, the pressure in the first reactor is in the range of from 20 to 80 bar, preferably in the range of from 30 to 70 bar, more preferably in the range of from 35 to 65 bar.

Hydrogen can be added in the first reactor in order to control the molecular weight, and thus the melt flow rate $MFR_2$ of the first propylene polymer fraction obtained in said first reactor.

Generally, the hydrogen/propylene ($H_2/C_3$) ratio in the first reactor is in the range of from 0.01 to 5.00 mol/kmol, preferably in the range of from 0.15 to 4.00 mol/kmol, more preferably in the range of from 0.25 to 3.00 mol/kmol.

Generally, the ratio of one or more comonomers (selected from $C_4$-$C_{10}$ alpha-olefins) to $C_3$, in the first reactor, is in the range of from 3 to 300 mol/kmol, preferably in the range of from 10 to 250 mol/kmol, more preferably in the range of from 20 to 200 mol/kmol.

Generally, the reaction mixture of the first reactor is conveyed, preferably directly conveyed; into the second reactor. By "directly conveyed" is meant a process wherein the reaction mixture of the first reactor is led directly to the next polymerization step, i.e., the second reactor. Monomers comprising propylene and one or more comonomers selected from ethylene and $C_4$-$C_{10}$ alpha-olefins are fed into the second reactor. In the second reactor, a second propylene polymer fraction is obtained.

The second propylene polymer fraction generally has an ethylene comonomer content in the range of from 0.5 to 5.0 mol %, preferably in the range of from 0.5 to 4.0 mol %, more preferably in the range of from 1.0 to 3.0 mol %, relative to the total amount of monomers present in the second propylene polymer fraction.

The second propylene polymer fraction generally has a $C_4$-$C_{10}$ to alpha olefins comonomer content in the range of from 3.0 to 9.0 mol %, preferably in the range of from 4.0 to 8.0 mol %, more preferably in the range of from 5.0 to 7.0 mol %, relative to the total amount of monomers present in the second propylene polymer fraction.

Generally, the second propylene polymer fraction has a melt flow rate ($MFR_2$) in the range of from 3 to 12 g/10 min, preferably in the range of from 4 to 10 g/10 min, more preferably in the range of from 5 to 8 g/10 min. The $MFR_2$ is determined according to ISO 1133, at a temperature of 230° C. and under a load of 2.16 kg.

The operating temperature in the second reactor is generally in the range of from 70 to 95° C., preferably in the range of from 73 to 90° C., more preferably in the range of from 76 to 88° C.

Typically, the pressure in the second reactor is in the range of from 5 to 50 bar, preferably in the range of from 15 to 40 bar.

Hydrogen can be added in the second reactor in order to control the molecular weight, and thus the melt flow rate $MFR_2$ of the second propylene polymer fraction obtained in said second reactor.

Generally, the hydrogen/propylene ($H_2/C_3$) ratio in the second reactor is in the range of from 2.0 to 200.0 mol/kmol, preferably in the range of from 10.0 to 150.0 mol/kmol, more preferably in the range of from 12.0 to 100.0 mol/kmol.

Generally, the ratio of one or more comonomers (selected from $C_4$-$C_{10}$ alpha-olefins) to $C_3$ in the second reactor is in the range of from 10.0 to 300.0 mol/kmol, preferably in the range of from 15.0 to 250.0 mol/kmol, more preferably in the range of from 20.0 to 225.0 mol/kmol.

Generally, the ratio of ethylene to $C_3$ in the second reactor is in the range of from 2.0 to 65.0 mol/kmol, preferably in the range of from 10.0 to 45.0 mol/kmol. Generally, the reaction mixture of the second reactor is conveyed, preferably directly conveyed; into the third reactor. By "directly conveyed" is meant a process wherein the reaction mixture of the second reactor is led directly to the next polymerization step, i.e., the third reactor. Monomers comprising propylene and one or more comonomers selected from ethylene and optionally $C_4$-$C_{10}$ alpha-olefins are fed into the third reactor. In the third reactor, a polypropylene composition is obtained.

The polypropylene composition generally has an ethylene comonomer content in the range of from 0.5 to 5.0 mol %, preferably in the range of from 1.0 to 4.0 mol %, more preferably in the range of from 1.0 to 3.5 mol %, relative to the total amount of monomers present in the polypropylene composition.

The polypropylene composition generally has a $C_4$-$C_{10}$ alpha olefins comonomer content in the range of from 3.0 to 10.0 mol %, preferably in the range of from 4.0 to 9.0 mol %, more preferably in the range of from 4.0 to 7.1 mol %, relative to the total amount of monomers present in the polypropylene composition.

Generally, the polypropylene composition has a melt flow rate ($MFR_2$) in the range of from 3 to 12 g/10 min, preferably in the range of from 4 to 10 g/10 min, more preferably in the range of from 5 to 8 g/10 min. The $MFR_2$ is determined according to ISO 1133, at a temperature of 230° C. and under a load of 2.16 kg.

The operating temperature in the third reactor is generally in the range of from 65 to 95° C., preferably in the range of from 70 to 90° C., more preferably in the range of from 74 to 88° C.

Typically, the pressure in the third reactor is in the range of from 5 to 50 bar, preferably in the range of from 15 to 40 bar.

Hydrogen can be added in the third reactor in order to control the molecular weight, and thus the melt flow rate $MFR_2$ of the polypropylene composition obtained in said third reactor.

Generally the hydrogen/propylene ($H_2/C_3$) ratio in the third reactor is in the range of from 2.0 to 200.0 mol/kmol, preferably in the range of from 10.0 to 150.0 mol/kmol, more preferably in the range of from 12.0 to 100.0 mol/kmol.

Generally the ratio of the optionally one or more comonomers (selected from $C_4$-$C_{10}$ alpha-olefins) to $C_3$ in the third reactor is in the range of from 5.0 to 300.0 mol/kmol, preferably in the range of from 10.0 to 250.0 mol/kmol, more preferably in the range of from 10.0 to 225.0 mol/kmol.

Generally, the ratio of ethylene to $C_3$ in the third reactor is in the range of from 2.0 to 65.0 mol/kmol, preferably in the range of from 10.0 to 50.0 mol/kmol, more preferably in the range of from 15.0 to 45.0 mol/kmol.

In the process according to the invention, the propylene polymer produced in the first reactor, i.e., the first propylene polymer, is generally produced in an amount of less than or equal to 50.0 wt %, preferably in an amount of less than or equal to 45 wt %, more preferably in an amount of less than or equal to 41 wt %.

In the process according to the invention, the propylene polymer produced in the second reactor, i.e., the second propylene polymer, is generally produced in an amount of more than or equal to 30 wt %, preferably in an amount of more than or equal to 32 wt %, more preferably in an amount of more than or equal to 35 wt %.

In the process according to the invention, the propylene polymer produced in the third reactor, i.e., the third propylene polymer, is generally produced in an amount in the range of from 5 to 45 wt %, preferably in an amount in the range of from 10 to 40 wt %, more preferably in an amount in the range of from 15 to 35 wt %. The amount of the first propylene polymer, the second propylene polymer and the third propylene polymer is relative to the total sum of first propylene polymer, second propylene polymer and third propylene polymer comprised in the polypropylene composition.

In a preferred embodiment, the one or more $C_4$-$C_{10}$ alpha-olefins are incorporated into the reactors of the inventive process in different amounts resulting in a polypropylene composition having trimodal comonomer composition with respect to the comonomer content of each of the propylene polymers comprised in said polypropylene composition, i.e., first propylene polymer, second propylene polymer and third propylene polymer.

In the process according to the invention, the one or more comonomers are selected from ethylene and $C_4$-$C_{10}$ alpha-olefins, preferably selected from ethylene and $C_4$-$C_8$ alpha-olefins, more preferably selected from ethylene and $C_4$-$C_{10}$ alpha-olefins, even more preferably selected from ethylene and $C_4$ alpha-olefin, further even more preferably selected from ethylene and 1-butene.

After the polymerization in the third reactor step, the polypropylene composition obtained in the third reactor is recovered by conventional procedures know by the person skilled in the art. The recovered polypropylene composition according to the invention is generally in the form of particles.

Generally, a polymerization catalyst is present in the process according to the invention. The polymerization catalyst is preferably a Ziegler-Natta catalyst. Generally, the polymerization Ziegler-Natta catalyst comprises one or more compounds of a transition metal (TM) of Group 4 to 6 as defined in IUPAC version 2013, like titanium, further a Group 2 metal compound, like a magnesium compound and an internal donor (ID).

The components of the catalyst may be supported on a particulate support, such as for example an inorganic oxide, like for example silica or alumina. Alternatively, a magnesium halide may form the solid support. It is also possible that the catalyst components are not supported on an external support, but the catalyst is prepared by an emulsion-solidification method or by a precipitation method, as is well-known by the man skilled in the art of catalyst preparation.

Preferably, a specific type of Ziegler-Natta catalyst is present in the process according to the invention. In this specific type of Ziegler-Natta catalyst, it is essential that the internal donor is a non-phthalic compound. Preferably, through the whole specific type of Ziegler-Natta catalyst preparation no phthalate compound is used, thus the final specific type of Ziegler-Natta catalyst does not contain any phthalic compound. Thus, the specific type of Ziegler-Natta catalyst is free of phthalic compound. Therefore, the polypropylene composition obtained in the third reactor of the process according to the invention is free of phthalic compound.

Generally, the specific type of Ziegler-Natta catalyst comprises an internal donor (ID) which is chosen to be a non-phthalic compound, in this way the specific type of Ziegler-Natta catalyst is completely free of phthalic compound. Further, the specific type of Ziegler-Natta catalyst can be a solid catalyst preferably being free of any external support material, like silica or $MgCl_2$, and thus the solid catalyst is self-supported.

The solid catalyst is obtainable by the following general procedure:
a) providing a solution of
  $a_1$) at least a Group 2 metal alkoxy compound (Ax) being the reaction product of a Group 2 metal compound and an alcohol (A) comprising in addition to the hydroxyl moiety at least one ether moiety, optionally in an organic liquid reaction medium; or
  $a_2$) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or
  $a_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or
  $a_4$) Group 2 metal alkoxy compound of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is a Group 2 metal, X is halogen, $R_1$ and $R_2$ are different alkyl groups of 2 to 16 carbon atoms, and $0 \leq n < 2$, $0 \leq m < 2$ and $n+m+(2-n-m)=2$, provided that n and m are not 0 simultaneously, $0 < n' \leq 2$ and $0 < m' \leq 2$; and
b) adding said solution from step a) to at least one compound of a transition metal of Group 4 to 6 and
c) obtaining the solid catalyst component particles,
and adding a non-phthalic internal electron donor (ID) at least in one step prior to step c).

The internal donor (ID) or precursor thereof is preferably added to the solution of step a) or to the transition metal compound before adding the solution of step a).

According to the procedure above, the solid catalyst can be obtained via a precipitation method or via an emulsion—solidification method depending on the physical conditions, especially the temperature used in steps b) and c). An emulsion is also called liquid-liquid two-phase system. In both methods (precipitation or emulsion-solidification) the catalyst chemistry is the same.

In the precipitation method, combination of the solution of step a) with at least one transition metal compound in step b) is carried out and the whole reaction mixture is kept at least at 50° C., more preferably in a temperature range of 55 to 110° C., more preferably in a range of 70 to 100° C., to secure full precipitation of the catalyst component in the form of solid catalyst component particles (step c).

In the emulsion-solidification method, in step b) the solution of step a) is typically added to the at least one transition metal compound at a lower temperature, such as from −10 to below 50° C., preferably from −5 to 30° C. During agitation of the emulsion the temperature is typically kept at −10 to below 40° C., preferably from −5 to 30° C. Droplets of the dispersed phase of the emulsion form the active catalyst composition. Solidification (step c) of the droplets is suitably carried out by heating the emulsion to a temperature of 70 to 150° C., preferably to 80 to 110° C. The catalyst prepared by the emulsion-solidification method is preferably used in the present invention.

In step a) preferably the solution of $a_2$) or $a_3$) is used, i.e. a solution of (Ax') or a solution of a mixture of (Ax) and (Bx).

Preferably, the Group 2 metal is magnesium. The magnesium alkoxy compounds (Ax), (Ax'), (Bx) can be prepared in situ in the first step of the catalyst preparation process, step a), by reacting the magnesium compound with the alcohol(s) as described above. Another option is to prepare said magnesium alkoxy compounds separately or they can be even commercially available as already prepared magnesium alkoxy compounds and used as such in the catalyst preparation process of the invention.

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy) ethanol, 2-butyloxy ethanol, 2-hexyloxy ethanol and 1,3-propylene-glycol-monobutyl ether, 3-butoxy-2-propanol, with 2-(2-ethylhexyloxy) ethanol and 1,3-propylene-glycol-monobutyl ether, 3-butoxy-2-propanol being particularly preferred.

The illustrative monohydric alcohol (B) is represented by the structural formula ROH with R being a straight-chain or branched $C_2$-$C_{16}$ alkyl residue, preferably a $C_4$ to $C_{10}$ alkyl residue, more preferably a $C_6$ to $C_8$ alkyl residue. The most preferred monohydric alcohol is 2-ethyl-1-hexanol or octanol.

Preferably, a mixture of Mg alkoxy compounds (Ax) and (Bx) or a mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

The magnesium alkoxy compound may be a reaction product of alcohol(s), as defined above and a magnesium compound selected from dialkyl magnesium, alkyl magnesium alkoxide, magnesium dialkoxide, alkoxy magnesium halide and alkyl magnesium halide. Further, magnesium dialkoxide, magnesium diaryloxide, magnesium aryloxyhalide, magnesium aryloxide and magnesium alkyl aryloxide can be used. Alkyl groups in the magnesium compound can be similar or different $C_1$-$C_{20}$ alkyl groups, preferably $C_2$-$C_{10}$ alkyl groups. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred, dialkyl magnesiums are butyl octyl magnesium or butyl ethyl magnesium.

It is also possible that the magnesium compound reacts in addition to the alcohol (A) and alcohol (B) with a polyhydric alcohol (C) of formula $R''(OH)_m$ to obtain said magnesium alkoxide compound. Preferred polyhydric alcohols, if used, are alcohols, wherein R" is a straight-chain, cyclic or branched $C_2$ to $C_{10}$ hydrocarbon residue and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides or a mixture of magnesium dihalide and a magnesium dialkoxide.

The solvent to be employed for the preparation of the present catalyst may be selected from among aromatic and aliphatic straight-chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Hexanes and pentanes are particularly preferred.

The reaction for the preparation of the magnesium alkoxy compound may be carried out at a temperature of 40 to 70° C. The man skilled in the art knows how to select the most suitable temperature depending on the Mg compound and alcohol(s) used.

The transition metal (TM) compound of Group 4 to 6 as defined in IUPAC version 2013 is preferably a titanium compound, most preferably a titanium halide, like $TiCl_4$.

The non-phthalic internal donor (ID) used in the preparation of the specific type of Ziegler-Natta catalyst used in the present invention is preferably selected from (di)esters of non-phthalic carboxylic (di)acids, 1,3-diethers, derivatives and mixtures thereof. An especially preferred donor is a diester of mono-unsaturated non-phthalic dicarboxylic acids, in particular an ester belonging to a group comprising malonates, maleates, succinates, citraconates, glutarates, cyclohexene-1,2-dicarboxylates and benzoates and derivatives thereof and/or mixtures thereof. Preferred examples are e.g. substituted maleates and citraconates, most preferably citraconates.

Here and hereinafter the term derivative includes substituted compounds.

In the emulsion-solidification method, the two phase liquid-liquid system may be formed by simple stirring and optionally adding (further) solvent(s) and/or additives, such as a turbulence minimizing agent (TMA) and/or an emulsifying agent and/or an emulsion stabilizer, like a surfactant, which are used in a manner known in the art. These solvents and/or additives are used to facilitate the formation of the emulsion and/or stabilize it. Preferably, surfactants are acrylic or methacrylic polymers. Particularly preferred are unbranched $C_{12}$ to $C_{20}$ (meth)acrylates such as for example poly(hexadecyl)-methacrylate and poly(octadecyl)-methacrylate and mixtures thereof. The turbulence minimizing agent (TMA), if used, is preferably selected from polymers of α-olefin monomers with 6 to 20 carbon atoms, like polyoctene, polynonene, polydecene, polyundecene or polydodecene or mixtures thereof. Most preferable it is polydecene.

The solid particulate product obtained by the precipitation or emulsion—solidification method may be washed at least once, preferably at least twice, most preferably at least three times. The washing can take place with an aromatic and/or aliphatic hydrocarbon, preferably with toluene, heptane or pentane. Washing is also possible with $TiCl_4$ optionally combined with the aromatic and/or aliphatic hydrocarbon. Washing liquids can also contain donors and/or compounds of Group 13, like trialkyl aluminium, halogenated alky aluminium compounds or alkoxy aluminium compounds. Aluminium compounds can also be added during the catalyst synthesis. The catalyst can further be dried, for example by evaporation or flushing with nitrogen or it can be slurried to an oily liquid without any drying step.

The finally obtained specific type of Ziegler-Natta catalyst is desirably obtained in the form of particles having generally an average particle size range of 5 to 200 μm, preferably 10 to 100 μm. The particles are generally compact with low porosity and have generally a surface area below 20 g/m², more preferably below 10 g/m². Typically, the amount of Ti present in the catalyst is in the range of from 1 to 6 wt %, the amount of Mg is in the range of from 10 to 20 wt % and the amount of internal donor present in the catalyst is in the range of from 10 to 40 wt % of the catalyst composition. A detailed description of the preparation of the catalysts used in the present invention is disclosed in WO2012/007430, EP2610271 and EP2610272 which are incorporated here by reference.

An external donor (ED) is preferably present as a further component in the polymerization process according to the invention. Suitable external donors (ED) include certain silanes, ethers, esters, amines, ketones, heterocyclic compounds and blends of these. It is especially preferred to use a silane. It is most preferred to use silanes of the general formula (I)

$$R^a_p R^b_q Si(OR^c)_{(4-p-q)} \quad\quad (I)$$

wherein $R^a$, $R^b$ and $R^c$ denote a hydrocarbon radical, in particular an alkyl or cycloalkyl group, and wherein p and q are numbers ranging from 0 to 3 with their sum (p+q) being equal to or less than 3. $R^a$, $R^b$ and $R^c$ can be chosen independently from one another and can be the same or different. Specific examples of silanes according to formula (I) are (tert-butyl)$_2$Si(OCH$_3$)$_2$, (cyclohexyl)(methyl)Si(OCH$_3$)$_2$, (phenyl)$_2$Si(OCH$_3$)$_2$ and (cyclopentyl)$_2$Si(OCH$_3$)$_2$. Another most preferred silane is according to the general formula (II)

$$Si(OCH_2CH_3)_3(NR^3R^4) \quad\quad (II)$$

wherein $R^3$ and $R^4$ can be the same or different and represent a linear, branched or cyclic hydrocarbon group having 1 to 12 carbon atoms. It is in particular preferred that $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl. Most preferably ethyl is used.

Generally, in addition to the Ziegler-Natta catalyst or the specific type of Ziegler-Natta catalyst and the optional external donor (ED) a co-catalyst (Co) can be present in the polymerization process according to the invention. The co-catalyst is preferably a compound of group 13 of the periodic table (IUPAC, version 2013), such as for example an aluminum compound, e.g. an organo aluminum or aluminum halide compound. An example of a suitable organo aluminium compound is an aluminum alkyl or aluminum alkyl halide compound. Accordingly, in one specific embodiment the co-catalyst (Co) is a trialkylaluminium, like triethylaluminium (TEAL), dialkyl aluminium chloride or alkyl aluminium dichloride or mixtures thereof. In one specific embodiment the co-catalyst (Co) is triethylaluminium (TEAL).

Generally, the molar ratio between the co-catalyst (Co) and the external donor (ED) [Co/ED] and/or the molar ratio between the co-catalyst (Co) and the transition metal (TM) [Co/TM] is carefully chosen for each process. The molar ratio between the co-catalyst (Co) and the external donor (ED), [Co/ED] can suitably be in the range of from 2.5 to 50.0 mol/mol, preferably in the range of from 4.0 to 35.0 mol/mol, more preferably in the range of from 5.0 to 30.0 mol/mol.

The molar ratio between the co-catalyst (Co) and the transition metal (TM), [Co/TM] can suitably be in the range of from 20.0 to 500.0 mol/mol, preferably in the range of from 50.0 to 400.0 mol/mol, more preferably in the range of from 100.0 to 300.0 mol/mol.

According to the present invention, the polypropylene composition recovered from the polymerization process may be pelletized in a conventional compounding extruder with one or more additives. Examples of additives include, but are not limited to, stabilizers such as antioxidants (for example sterically hindered phenols, phosphites/phosphonites, sulphur containing antioxidants, alkyl radical scavengers, aromatic amines, hindered amine stabilizers, or blends thereof), metal deactivators (for example Irganox® MD 1024), or UV stabilizers (for example hindered amine light stabilizers). Other typical additives are modifiers such as antistatic or antifogging agents (for example ethoxylated amines and amides or glycerol esters), acid scavengers (for example Ca-stearate), blowing agents, cling agents (for example polyisobutene), lubricants and resins (for example ionomer waxes, polyethylene- and ethylene copolymer waxes, Fischer Tropsch waxes, montan-based waxes, fluoro-based compounds, or paraffin waxes), as well as slip and antiblocking agents (for example erucamide, oleamide, talc, natural silica and synthetic silica or zeolites) and mixtures thereof.

Typically the polypropylene composition according to the invention may contain less than or equal to 5.0 wt %, preferably less than or equal to 3.0 wt %, more preferably less than or equal to 2.0 wt % of the one or more additives mentioned herein.

At the end of the extruder, a polypropylene composition melt is obtained. The inventive polypropylene composition melt might then be passed through a die. When the inventive polypropylene composition melt is passed through the die it is generally further cooled down and then pelletized in a pelletizer.

The die zone typically comprises a die plate, which is generally a thick metal disk having multiple holes. The holes are parallel to the screw axis.

The pelletizer is generally a strand pelletizer or an underwater pelletizer.

The invention also relates to a process according to the invention wherein the process is carried out in the absence of an anti-fouling agent. Examples of anti-fouling agent are Grinsted™ PS432 (Polyglycerol ester/Acetic Ester Blend) and Statsafe™ 3000 (surfactant in a liquid hydrocarbon solvent system). The process according to the present invention has the advantage that, when it is carried out in the absence of an anti-fouling agent, a higher productivity of the catalyst present in the process is achieved. This is possible due to the fact that the anti-fouling agent may be a poison for the catalyst.

The invention also provides a polypropylene composition obtainable, preferably obtained, by the process according to the invention.

The polypropylene composition obtainable, preferably obtained, by the process according to the invention, generally has an ethylene comonomer content in the range of from 0.5 to 5.0 mol %, preferably in the range of from 1.0 to 4.0 mol %, more preferably in the range of from 1.0 to 3.5 mol %, relative to the total amount of monomers present in the polypropylene composition.

The polypropylene composition obtainable, preferably obtained, by the process according to the invention, generally has a $C_4$-$C_{20}$ alpha olefins comonomer content in the range of from 3.0 to 10.0 mol %, preferably in the range of from 4.0 to 9.0 mol %, more preferably in the range of from 4.0 to 7.1 mol %, relative to the total amount of monomers present in the polypropylene composition.

The polypropylene composition obtainable, preferably obtained, by the process according to the invention, generally has one or more comonomers selected from ethylene and $C_4$-$C_{10}$ alpha-olefins, preferably selected from ethylene and $C_4$-$C_8$ alpha-olefins, more preferably selected from ethylene and $C_4$-$C_6$ alpha-olefins, even more preferably selected from ethylene and $C_4$ alpha-olefin, further even more preferably selected from ethylene and 1-butene.

Generally, the polypropylene composition obtainable, preferably obtained, by the process according to the invention, has a melt flow rate ($MFR_2$) in the range of from 3 to 12 g/10 min, preferably in the range of from 4 to 10 g/10 min, more preferably in the range of from 5 to 8 g/10 min. The $MFR_2$ is determined according to ISO 1133, at a temperature of 230° C. and under a load of 2.16 kg.

Generally, the polypropylene composition obtainable, preferably obtained, by the process according to the invention has a melting temperature of from 135 to 160° C., preferably in the range of from 137 to 160° C., more preferably in the range of from 139 to 159° C. The melting temperature (Tm) is measured by DSC according to ISO 11357/3.

Generally, the polypropylene composition obtainable, preferably obtained, by the process according to the invention has a xylene soluble content (XCS) in the range of from 6 to 25 wt %, preferably in the range of from 8 to 23 wt %, more preferably in the range of from 10 to 20 wt %. The xylene soluble fraction is determined according to ISO 16152 at 25° C.

Generally the polypropylene composition obtainable, preferably obtained, by the process according to the invention has a sealing initiation temperature (SIT) in the range of from 90 to 115° C., preferably in the range of from 95 to 112° C., more preferably in the range of from 100 to 110° C. The sealing initiation temperature (SIT) calculated on pellets via DSC measurement, according to the method described in the measuring methods section of this document.

Generally the polypropylene composition obtainable, preferably obtained, by the process according to the invention satisfies the equation (1) below:

$$\text{Delta} = Tm - \text{SIT} \qquad \text{equation (1).}$$

wherein Delta is in the range of from 30 to 45° C., and wherein
Tm is the melting temperature, in ° C., of the polypropylene composition obtainable, preferably obtained, by the process according to the invention,
SIT is the sealing initiation temperature (SIT) of the polypropylene composition obtainable, preferably obtained, by the process according to the invention; calculated on pellets via DSC measurement, according to the method described in the measuring methods section of this document.

Preferably the Delta value according to equation (1) is in the range of from 33 to 43° C., more preferably in the range of from 35 to 40° C.

The invention also provides a polypropylene composition according to the invention.

The polypropylene composition according to the invention, generally has an ethylene comonomer content in the range of from 0.5 to 5.0 mol %, preferably in the range of from 1.0 to 4.0 mol %, more preferably in the range of from 1.0 to 3.5 mol %, relative to the total amount of monomers present in the polypropylene composition.

The polypropylene composition according to the invention, generally has a $C_4$-$C_{10}$ alpha olefins comonomer content in the range of from 3.0 to 10.0 mol %, preferably in the range of from 4.0 to 9.0 mol %, more preferably in the range of from 4.0 to 7.1 mol %, relative to the total amount of monomers present in the polypropylene composition.

The polypropylene composition according to the invention generally has one or more comonomers selected from ethylene and $C_4$-$C_{10}$ alpha-olefins, preferably selected from ethylene and $C_4$-$C_8$ alpha-olefins, more preferably selected from ethylene and $C_4$-$C_6$ alpha-olefins, even more preferably selected from ethylene and $C_4$ alpha-olefin, further even more preferably selected from ethylene and 1-butene.

Generally, the polypropylene composition according to the invention has a melt flow rate ($MFR_2$) in the range of from 3 to 12 g/10 min, preferably in the range of from 4 to 10 g/10 min, more preferably in the range of from 5 to 8 g/10 min. The $MFR_2$ is determined according to ISO 1133, at a temperature of 230° C. and under a load of 2.16 kg.

Generally, the polypropylene composition according to the invention has a melting temperature of from 135 to 160° C., preferably in the range of from 137 to 160° C., more preferably in the range of from 139 to 159° C. The melting temperature (Tm) is measured by DSC according to ISO 11357/3.

Generally, the polypropylene composition according to the invention has a xylene soluble content (XCS) in the range of from 6 to 25 wt %, preferably in the range of from 8 to 23 wt %, more preferably in the range of from 10 to 20 wt %. The xylene soluble fraction is determined according to ISO 16152 at 25° C.

Generally the polypropylene composition according to the invention has a sealing initiation temperature (SIT) in the range of from 90 to 115° C., preferably in the range of from 95 to 112° C., more preferably in the range of from 100 to 110° C. The sealing initiation temperature (SIT) calculated on pellets via DSC measurement, according to the method described in the measuring methods section of this document.

Generally, the polypropylene composition according to the invention satisfies the equation (1) below:

$$\text{Delta} = Tm - \text{SIT} \qquad \text{equation (1).}$$

wherein Delta is in the range of from 30 to 45° C., and wherein
Tm is the melting temperature, in ° C., of the polypropylene composition according to the invention,
SIT is the sealing initiation temperature (SIT) of the polypropylene composition; calculated on pellets via DSC measurement, according to the method described in the measuring methods section of this document.

Preferably the Delta value according to equation (1) is in the range of from 33 to 43° C., more preferably in the range of from 35 to 40° C.

The present invention also provides an article comprising the polypropylene composition obtainable, preferably obtained, by the process according to the invention or the polypropylene composition according to the invention. Suitable articles are films, e.g., films for flexible packaging systems, such as bags or pouches for food packaging in general. Preferred articles are mono-layer or multilayer films which can be obtained by any process known to an art skilled person, like cast film technology or blown film technology. The films are preferably used in multilayer film structures as sealing layer, preferably as very thin sealing layer, on top of the multilayer structure.

The present invention is also related to an article comprising at least 70.0 wt %, preferably comprising at least 80.0 wt %, more preferably comprising at least 90.0 wt %, still more preferably comprising at least 95.0 wt %, yet more preferably comprising at least 99.0 wt % of the polypropylene composition obtainable, preferably obtained, by the process according to the invention or the polypropylene composition according to the invention.

Finally the present invention relates to the use of the polypropylene composition obtainable, preferably obtained, by the process according to the invention or the polypropylene composition according to the invention for producing an article, a film or a multilayer film.

EXAMPLES

I. Measuring Methods a) Melt Flow Rate

The melt flow rate (MFR) is determined according to ISO 1133 and is indicated in g/10 min. The MFR is an indication of the flowability and hence the processability of the polymer. The higher the melt flow rate, the lower the viscosity of the polymer. The $MFR_2$ of polypropylene is determined at a temperature of 230° C. and under a load of 2.16 kg.

b) DSC Analysis

The melting temperature, Tm, is determined by differential scanning calorimetry 25 (DSC) according to ISO 11357-3 with a TA-Instruments 2920 Dual-Cell with RSC refrigeration apparatus and data station. A heating and cooling rate of 10° C./min is applied in a heat/cool/heat cycle between +23 and +210° C. The melting temperature (Tm) is being determined in the second heating step.

c) Xylene Soluble Content (XCS, Wt %)

The content of the polymer soluble in xylene is determined according to ISO 16152; 5$^{th}$ edition; 2005 Jul. 1 at 25° C.

d) Sealing Initiation Temperature (SIT), Sealing Range

Differential Scanning calorimetry (DSC) experiments were run on a TA Instruments Q2000 device calibrated with Indium, Zinc, and Tin according to ISO 11357/1. The measurements were run under nitrogen atmosphere (50 mL min-1) on 5±0.5 mg samples in a heat/cool/heat cycle with a scan rate of 10° C./min between −30° C. and 225° C.

according to ISO 11357/3. Melting (Tm) and crystallisation (Tc) temperatures were taken as the peaks of the endotherms and exotherms in the cooling cycle and the second heating cycle respectively.

The Sealing Initiation Temperature (SIT) was predicted by analyzing the second heating scan according to the following procedure: the first limit for integration was set at 16° C., the second limit at Tm+20° C., and the total melting enthalpy was registered. The temperature T1 is defined as the temperature at which 19% of this melting enthalpy with the abovementioned limits for integration was obtained. The parameter SIT is finally calculated as:

$$SIT = 1.0596 \times T1 + 3.8501$$

e) Comonomer Content

Quantitative $^{13}C\{^1H\}$ NMR spectra recorded in the molten-state using a Bruker Advance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 180° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification {klimke06, parkinson07, castignolles09}. Standard single-pulse excitation was employed utilising the NOE at short recycle delays of 3 s {pollard04, klimke06} and the RS-HEPT decoupling scheme {fillip05, griffin07}. A total of 1024 (1k) transients were acquired per spectra.

Quantitative $^{13}C\{^1H\}$ NMR spectra were processed, integrated and relevant quantitative properties determined from the integrals. All chemical shifts are internally referenced to the methyl isotactic pentad (mmmm) at 21.85 ppm. Characteristic signals corresponding to the incorporation of 1-butene were observed and the comonomer content quantified in the following way. The amount isolated 1-butene incorporated in PBP sequences was quantified using the integral of the aB2 sites at 43.6 ppm accounting for the number of reporting sites per comonomer:

$$B = I_{\alpha B2}/2$$

The amount consecutively incorporated 1-butene in PBBP sequences was quantified using the integral of the $\alpha\alpha B2$ site at 40.5 ppm accounting for the number of reporting sites per comonomer:

$$BB = 2 \ast I_{\alpha\alpha B2}$$

The total 1-butene content was calculated based on the sum of isolated and consecutively incorporated 1-butene:

$$B\text{total} = B + BB$$

Characteristic signals corresponding to the incorporation of ethylene were observed and the comonomer content quantified in the following way. The amount isolated ethylene incorporated in PEP sequences was quantified using the integral of the S$\alpha\gamma$ sites at 37.9 ppm accounting for the number of reporting sites per comonomer:

$$E = I_{S\alpha\gamma}/2$$

When characteristic signals corresponding to consecutive ethylene incorporation in PEEP sequences were observed the amount of such consecutively incorporated ethylene was quantified using the integral of Sp sites at 27 ppm accounting for the number of reporting sites per comonomer:

$$EE = I_{S\beta\delta}$$

With no sites indicative of consecutive ethylene incorporation in PEEE sequences observed the total ethylene comonomer content was calculated as:

$$E\text{total} = E + EE$$

Characteristic signals corresponding to regio defects were not observed {resconi00}. The amount of propene was quantified based on the main S$\alpha\alpha$ methylene sites at 46.7 ppm and compensating for the relative amount of methylene unit of propene in PBP, PBBP, PEP and PEEP sequences not accounted for:

$$P\text{total} = I_{S\alpha\alpha} + B + BB/2 + E + EE/2$$

The total mole fraction of 1-butene in the polymer was then calculated as:

$$fB = (B\text{total}/(E\text{total} + P\text{total} + B\text{total}))$$

The total mole fraction of ethylene in the polymer was then calculated as:

$$fE = (E\text{total}/(E\text{total} + P\text{total} + B\text{total}))$$

The mole percent comonomer incorporation was calculated from the mole fractions:

$$B \text{ [mol \%]} = 100 \ast fB$$

$$E \text{ [mol \%]} = 100 \ast fE$$

The weight percent comonomer incorporation was calculated from the mole fractions:

$$B \text{ [wt \%]} = 100 \ast (fB \ast 56.11)/((fE \ast 28.05) + (fB \ast 56.11) + ((1-(fE+fB)) \ast 42.08))$$

$$E \text{ [wt \%]} = 100 \ast (fE \ast 28.05)/((fE \ast 28.05) + (fB \ast 56.11) + ((1-(fE+fB)) \ast 42.08)).$$

klimke06
Klimke, K., Parkinson, M., Piel, C., Kaminsky, W., Spiess, H. W., Wilhelm, M., Macromol. Chem. Phys. 2006; 207:382.
parkinson07
Parkinson, M., Klimke, K., Spiess, H. W., Wilhelm, M., Macromol. Chem. Phys. 2007; 208:2128.
pollard04
Pollard, M., Klimke, K., Graf, R., Spiess, H. W., Wilhelm, M., Sperber, O., Piel, C., Kaminsky, W., Macromolecules 2004; 37:813.
filip05
Filip, X., Tripon, C., Filip, C., J. Mag. Resn. 2005, 176, 239
griffin07
Griffin, J. M., Tripon, C., Samoson, A., Filip, C., and Brown, S. P., Mag. Res. in Chem. 2007 45, S1, S198
castignolles09
Castignolles, P., Graf, R., Parkinson, M., Wilhelm, M., Gaborieau, M., Polymer 50 (2009) 2373
busico01
Busico, V., Cipullo, R., Prog. Polym. Sci. 26 (2001) 443
busico97
Busico, V., Cipullo, R., Monaco, G., Vacatello, M., Segre, A. L., Macromoleucles 30 (1997) 6251
zhou07
Zhou, Z., Kuemmerle, R., Qiu, X., Redwine, D., Cong, R., Taha, A., Baugh, D. Winniford, B., J. Mag. Reson. 187 (2007) 225
busico07
Busico, V., Carbonniere, P., Cipullo, R., Pellecchia, R., Severn, J., Talarico, G., Macromol. Rapid Commun. 2007, 28, 1128
resconi00
Resconi, L., Cavallo, L., Fait, A., Piemontesi, F., Chem. Rev. 2000, 100, 1253

II. Inventive and Comparative Examples a) Catalyst Preparation

For the preparation of the catalyst 3.4 litre of 2-ethylhexanol and 810 ml of propylene glycol butyl monoether (in a molar ratio 4/1) were added to a 20.0l reactor. Then 7.8 litre of a 20.0% solution in toluene of BEM (butyl ethyl magnesium) provided by Crompton GmbH, were slowly added to the well stirred alcohol mixture. During the addition, the temperature was kept at 10.0° C. After addition, the temperature of the reaction mixture was raised to 60.0° C. and mixing was continued at this temperature for 30 minutes. Finally after cooling to room temperature the obtained Mg-alkoxide was transferred to a storage vessel. 21.2 g of Mg alkoxide prepared above was mixed with 4.0 ml bis(2-ethylhexyl) citraconate for 5 min. After mixing the obtained Mg complex was used immediately in the preparation of the catalyst component.

19.5 ml of titanium tetrachloride was placed in a 300 ml reactor equipped with a mechanical stirrer at 25.0° C. Mixing speed was adjusted to 170 rpm. 26.0 g of Mg-complex prepared above was added within 30 minutes keeping the temperature at 25.0° C. 3.0 ml of Viscoplex® 1-254 and 1.0 ml of a toluene solution with 2 mg Necadd 447™ was added. Then 24.0 ml of heptane was added to form an emulsion. Mixing was continued for 30 minutes at 25.0° C., after which the reactor temperature was raised to 90.0° C. within 30 minutes. The reaction mixture was stirred for a further 30 minutes at 90.0° C. Afterwards stirring was stopped and the reaction mixture was allowed to settle for 15 minutes at 90.0° C. The solid material was washed 5 times: washings were made at 80.0° C. under stirring for 30 min with 170 rpm. After stirring was stopped the reaction mixture was allowed to settle for 20-30 minutes and followed by siphoning.

Wash 1: washing was made with a mixture of 100 ml of toluene and 1 ml donor
Wash 2: washing was made with a mixture of 30 ml of TiCl4 and 1 ml of donor.
Wash 3: washing was made with 100 ml of toluene.
Wash 4: washing was made with 60 ml of heptane.
Wash 5: washing was made with 60 ml of heptane under 10 minutes stirring.

Afterwards stirring was stopped and the reaction mixture was allowed to settle for 10 minutes while decreasing the temperature to 70° C. with subsequent siphoning, followed by $N_2$ sparging for 20 minutes to yield an air sensitive powder.

b) Inventive Examples (IE1, IE2 and IE3)

The inventive examples (IE) were produced in a pilot plant with a prepolymerization reactor, one slurry loop reactor and two gas phase reactors. The solid catalyst component described above was used for the inventive examples IE1, IE2 and IE3 along with triethyl-aluminium (TEAL) as co-catalyst and dicyclo pentyl dimethoxy silane (D-donor) as external donor.

The polymerization process conditions, the properties of the propylene polymer fractions and of the polypropylene composition are described in Table 1.

c) Comparative Examples (CE1, CE2 and CE3)

CE1 is a $C_2C_4$ propylene terpolymer having a narrow molecular weight distribution and $MFR_2$ of 6.0 g/10 min and is manufactured and distributed by Borealis under the Trade name TD315BF.

CE2 is a $C_2C_4$ propylene terpolymer having a medium molecular weight distribution and $MFR_2$ of 6.0 g/10 min and is manufactured and distributed by Borealis under the Trade name TD210BF.

CE3 is a $C_2C_4$ propylene terpolymer having a medium molecular weight distribution and $MFR_2$ of 6.0 g/10 min and is manufactured and distributed by Borealis under the Trade name TD215BF.

TABLE 1

Polymerization process conditions, properties of the propylene polymer fractions and properties of the polypropylene composition

| | | IE1 | IE2 | IE3 |
|---|---|---|---|---|
| Pre-polymerization reactor | | | | |
| Temperature | [° C.] | 20 | 20 | 20 |
| Catalyst feed | [g/h] | 2.3 | 2.5 | 2.3 |
| D-Donor | [g/t propylene] | 52.3 | 52.2 | 52.2 |
| TEAL/propylene | [g/t propylene] | 160 | 160 | 160 |
| Al/D-Donor [Co/ED] | [mol/mol] | 6.2 | 6.2 | 6.2 |
| Al/Ti [Co/TM] | [mol/mol] | 153.1 | 140 | 151.4 |
| Residence Time | [h] | 0.4 | 0.4 | 0.4 |
| Loop reactor (first propylene polymer fraction) | | | | |
| Temperature | [° C.] | 70 | 70 | 70 |
| Pressure | [kPa] | 5238 | 5217 | 5244 |
| Residence time | [h] | 0.4 | 0.4 | 0.4 |
| Split* | [%] | 32 | 32 | 32 |
| $H_2/C_3$ ratio | [mol/kmol] | 1.10 | 1.10 | 1.10 |
| $C_4/C_3$ ratio | [mol/kmol] | 145 | 145 | 145 |
| $MFR_2$ | [g/10 min] | 6.6 | 6.1 | 5.9 |
| $C_4$ content | [mol %] | 6.2 | 4.8 | 5.2 |
| First gas-phase reactor (second propylene polymer fraction) | | | | |
| Temperature | [° C.] | 77 | 77 | 77 |
| Pressure | [kPa] | 2500 | 2500 | 2500 |
| Residence time | [h] | 1.9 | 1.9 | 2 |
| Split* | [%] | 41 | 40 | 36 |
| $H_2/C_3$ ratio | [mol/kmol] | 24.0 | 24.3 | 24.6 |
| $C_2/C_3$ ratio | [mol/kmol] | 33.9 | 21.5 | 22.6 |
| $C_4/C_3$ ratio | [mol/kmol] | 181.8 | 223.0 | 221.9 |
| $C_4$ content | [mol %] | 5.3 | 6.0 | 6.4 |
| $C_2$ content | [mol %] | 2.4 | 1.4 | 1.4 |
| $MFR_2$ | [g/10 min] | 5.7 | 6.8 | 6.5 |
| Second gas-phase reactor (polypropylene composition) | | | | |
| Temperature | [° C.] | 75 | 77 | 77 |
| Pressure | [kPa] | 2300 | 2300 | 2300 |
| Residence time | [h] | 0.6 | 0.6 | 0.6 |
| Split* | [%] | 27 | 28 | 32 |
| $H_2/C_3$ ratio | [mol/kmol] | 31.3 | 30.1 | 33.5 |
| $C_2/C_3$ ratio | [mol/kmol] | 41.6 | 19.6 | 22.8 |
| $MFR_2$ | [g/10 min] | 5.16 | 7.4 | 6.1 |
| $C_2$ content | [mol %] | 3.0 | 1.5 | 1.6 |
| $C_4/C_3$ ratio | [mol/kmol] | 12.5 | 180.7 | 182.3 |
| $C_4$ content | [mol %] | 4.8 | 7.1 | 6.6 |

*Split relates to the amount of propylene polymer produced in each specific reactor.

TABLE 2

Melting temperature (Tm), Seal initiation temperature (SIT) and Delta values of inventive examples (IE1, IE2) and comparative examples (CE1, CE2, CE3).

| | IE1 | IE2 | IE3 | CE1 | CE2 | CE3 |
|---|---|---|---|---|---|---|
| Tm | 143 | 142.1 | 141.6 | 129.8 | 132.8 | 131.3 |
| SIT [° C.] | 103.5 | 105.3 | 104.3 | 101.0 | 106.0 | 106.0 |
| Delta (Tm − SIT) | 39.5 | 36.8 | 37.3 | 29.0 | 27.0 | 25.0 |

From Table 2 it can be derived that the polypropylene compositions according to the invention present higher melting temperature (Tm) values and higher Delta (Tm–SIT) values than the comparative examples.

The invention claimed is:

1. A process for producing a polypropylene composition by sequential polymerization comprising the steps:
    a) polymerizing in a first reactor monomers consisting of propylene and a comonomer selected from $C_4$-$C_{10}$ alpha-olefins, to obtain a first propylene polymer fraction having a comonomer content in a range of from 2.0 to 8.0 mol %,
    b) polymerizing in a second reactor monomers consisting of propylene, ethylene, and a comonomer selected from $C_4$-$C_{10}$ alpha-olefins, in the presence of the first propylene polymer fraction, to obtain a second propylene polymer fraction, and
    c) polymerizing in a third reactor monomers consisting of propylene, ethylene, and optionally one or more $C_4$-$C_{10}$ alpha-olefins, in the presence of the second propylene polymer fraction, to obtain a polypropylene composition having an ethylene comonomer content in a range of from 0.5 to 5.0 mol % and a $C_4$-$C_{10}$ alpha-olefin comonomer content in a range of from 3.0 to 10.0 mol %, relative to a total amount of monomers present in the polypropylene composition, and
    wherein the process is operated in the presence of a Ziegler-Natta catalyst comprising a transition metal of group 4 to 6 of the periodic table, and an internal donor, optionally a co-catalyst and optionally an external donor, wherein the internal donor is a non-phthalic internal donor.

2. The process according to claim 1, wherein the second propylene polymer fraction has an ethylene comonomer content in a range of from 0.5 to 5.0 mol % and a $C_4$-$C_{10}$ alpha olefins comonomer content in a range of from 3.0 to 9.0 mol %, relative to the total amount of monomers present in the second propylene polymer fraction.

3. The process according to claim 1, wherein polymerization in the first reactor is carried out at a temperature in a range of from 62 to 85° C.

4. The process according to claim 1, wherein the non-phthalic internal donor is selected from (di)esters of non-phthalic carboxylic (di)acids wherein the (di)ester is selected from the group consisting of malonates, maleates, succinates, citraconates, glutarates, cyclohexene-1,2-dicarboxylates and benzoates and derivatives thereof or mixtures thereof.

5. The process according to claim 1, wherein the polypropylene composition has an $MFR_2$ in a range of from 3 to 12 g/10 min, as measured at 230° C. under a load of 2.16 kg according to ISO 1133.

6. The process according to claim 1, wherein the process is carried out in the absence of an anti-fouling agent.

7. A polypropylene composition obtained by the process of claim 1, wherein the polypropylene composition has an ethylene comonomer content in a range of from 0.5 to 5.0 mol % and a $C_4$-$C_{10}$ alpha olefins comonomer content in a range of from 3.0 to 10.0 mol %, relative to the total amount of monomers present in the polypropylene composition and, wherein the polypropylene composition has an $MFR_2$ in a range of from 3 to 12 g/10 min, as measured at 230° C. under a load of 2.16 kg according to ISO 1133, and wherein the polypropylene composition has a melting temperature in a range of from 135 to 160° C. and
    wherein the polypropylene composition has trimodal comonomer composition with respect to the comonomer content of each of the propylene polymers comprised in said polypropylene composition.

8. The polypropylene composition according to claim 7, wherein the polypropylene composition satisfies the equation:

Delta=Tm–SIT wherein Delta is a temperature in a range of from 30 to 45° C.,
Tm is the melting temperature, in ° C., of the polypropylene composition,
SIT is the sealing initiation temperature, in ° C., of the polypropylene composition.

9. The polypropylene composition according to claim 7, wherein the polypropylene composition has one or more comonomers selected from ethylene and 1-butene.

10. An article comprising the polypropylene composition according to claim 7.

11. The article according to claim 10, wherein said article is a film or a multilayer film.

* * * * *